United States Patent
Ottrando

(10) Patent No.: US 6,203,327 B1
(45) Date of Patent: Mar. 20, 2001

(54) TOILET TRAINING SYSTEM

(76) Inventor: Doreen Ottrando, 42 Joel Pl., Staten Island, NY (US) 10306

(*) Notice: Subject to any disclaimer, the term of this patent is extended or adjusted under 35 U.S.C. 154(b) by 0 days.

(21) Appl. No.: 09/421,602

(22) Filed: Oct. 20, 1999

(51) Int. Cl.[7] .................................................. G09B 23/28
(52) U.S. Cl. .......................... 434/262; 434/236; 273/236
(58) Field of Search .................................... 434/262, 236, 434/238; 273/236, 240; D20/39, 40, 41, 92

(56) References Cited

U.S. PATENT DOCUMENTS

| | | | |
|---|---|---|---|
| D. 308,989 | 7/1990 | Cohen | D20/39 |
| D. 316,278 * | 4/1991 | Cohen | D20/39 |
| D. 330,225 * | 10/1992 | Cohen | D20/42 |
| 2,414,614 * | 1/1947 | Shurick, Sr. | 434/238 |
| 5,573,404 * | 11/1996 | Stawski, II | 434/238 |
| 5,577,915 * | 11/1996 | Feldman | 434/238 |
| 5,639,242 | 6/1997 | Wilson | 434/238 |

* cited by examiner

*Primary Examiner*—Sam Rimell
(74) *Attorney, Agent, or Firm*—Goldstein & Canino

(57) ABSTRACT

A toilet training system, using a board having a pre-printed path having a path beginning and a path end. The path is made up of step spaces and reward goal spaces. Initially, the parent and child select a reward type, and write the reward type in one of the reward spaces. When the child successfully uses the toilet, one of the step spaces is marked, providing visual indication to the child that they are progressing toward one of the reward spaces, and the reward symbolized thereby. When a child fails to successfully use the toilet, the last marked step space is erased to provide the child with a gentle reminder about the set back in toilet training. Once the step space immediately preceding that reward space has been reached by virtue of successful uses of the toilet, the child is rewarded with the previously chosen reward.

5 Claims, 3 Drawing Sheets

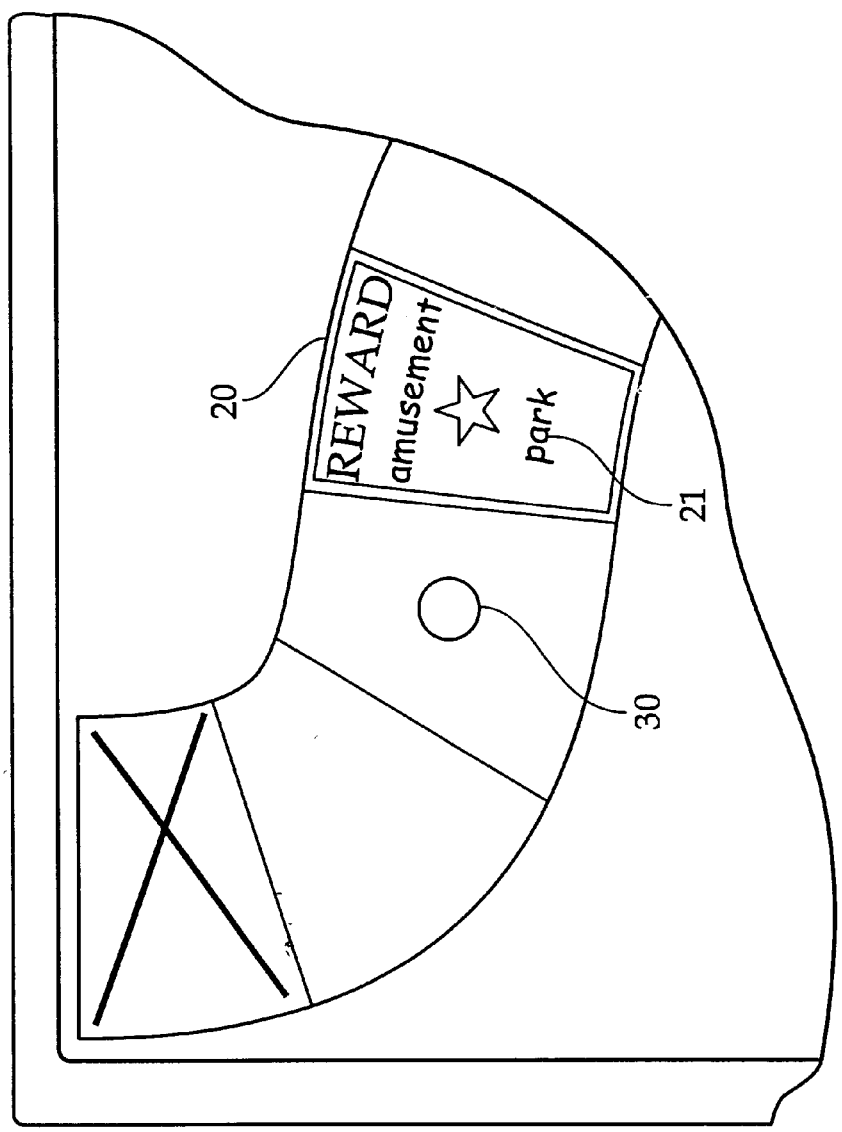

TOILET TRAINING SYSTEM

BACKGROUND OF THE INVENTION

The invention relates to a toilet training system. More particularly, the invention relates to a system for helping a parent toilet train a child, by allowing the parent and child to set reward goals, and to track progress toward reaching those reward goals.

Toilet training is a critical phase of a child's development and maturity. As a child learns to control his or her own elimination functions, the child is also learning to take responsibility for his or her actions in general.

Completion of toilet training can take a significant amount of time. The child will often continue to make progress, but will have an occasional setback. Care must be taken by the parent to be certain that an "accident" is handled properly. Scolding the child, or otherwise improper handling of such an occurrence can cause permanent trauma to the child. Accordingly, most experts believe that positive reinforcement is the best way to guide a child past such unpleasant events, while reinforcing the positive steps taken by the child toward permanent toilet training.

U.S. Design Pat. No. 308,989 to Cohen discloses an ornamental design for a wall mounted display board for children's toilet training. Cohen shows a wall chart which includes spaces that correspond to each of the days of the week.

U.S. Pat. No. 2,414,614 to Schurick discloses a mechanized chart which allows the behavior of several children to be tracked in competition with one another. The chart indicates progress toward a prize which is automatically ejected when the first child reaches a predetermined location on the board.

U.S. Pat. No. 5,577,915 to Feldman discloses a motivational task tracking device. Feldman tracks a variety of household chores, and has provisions for recording successful completion of said tasks.

U.S. Pat. No. 5,639,242 to Wilson discloses an educational daily responsibilities learning system, wherein progress on a looped road is achieved through the accomplishment of a variety of tasks, such as picking up toys, setting the table, etc.

While these units may be suitable for the particular purpose employed, or for general use, they would not be as suitable for the purposes of the present invention as disclosed hereafter.

SUMMARY OF THE INVENTION

It is an object of the invention to produce a toilet training system which helps a parent fulfill toilet training guidance. Accordingly, a system of positive reinforcement is provided wherein a child is rewarded for successful meeting toilet training goals.

It is another object of the invention to provide a toilet training system which tracks toilet training progress. Accordingly, a board is provided having a pre-printed path which is made up of a several step spaces, which allows a child and parent to record successful toilet use in one of the step spaces. Sequential successful toilet usage is recorded in subsequent step spaces along the path.

It is a further object of the invention to provide a toilet training system which makes the child cognizant of toilet training set backs. Accordingly, when the child fails to use the toilet, the child regresses along the path further from the reward goal, providing a gentle reminder concerning the failure.

It is still further object of the invention to provide a toilet training system in which reward goals are clearly apparent to the child. Accordingly, the path has a plurality of reward goal spaces which are separated by a predetermined number of step spaces. The child can visualize how far he or she is from reaching one of the reward goal spaces.

It is yet a further object of the invention to allow a child to select and record a desired reward. Accordingly, provision is made to allow recordation of the desired reward on the reward goal space itself.

The invention is a toilet training system, using a board having a pre-printed path having a path beginning and a path end. The path is made up of step spaces and reward goal spaces. Initially, the parent and child select a reward type, and write the reward type in one of the reward spaces. When the child successfully uses the toilet, one of the step spaces is marked, providing visual indication to the child that they are progressing toward one of the reward spaces, and the reward symbolized thereby. When a child fails to successfully use the toilet, the last marked step space is erased to provide the child with a gentle reminder about the set back in toilet training. Once the step space immediately preceding that reward space has been reached by virtue of successful uses of the toilet, the child is rewarded with the previously chosen reward.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 3 is an enlarged front elevational view, showing a portion of the board, wherein a reward type has been written into one of the reward goal spaces.

DETAILED DESCRIPTION OF THE PREFERRED EMBODIMENTS

Figure 1:
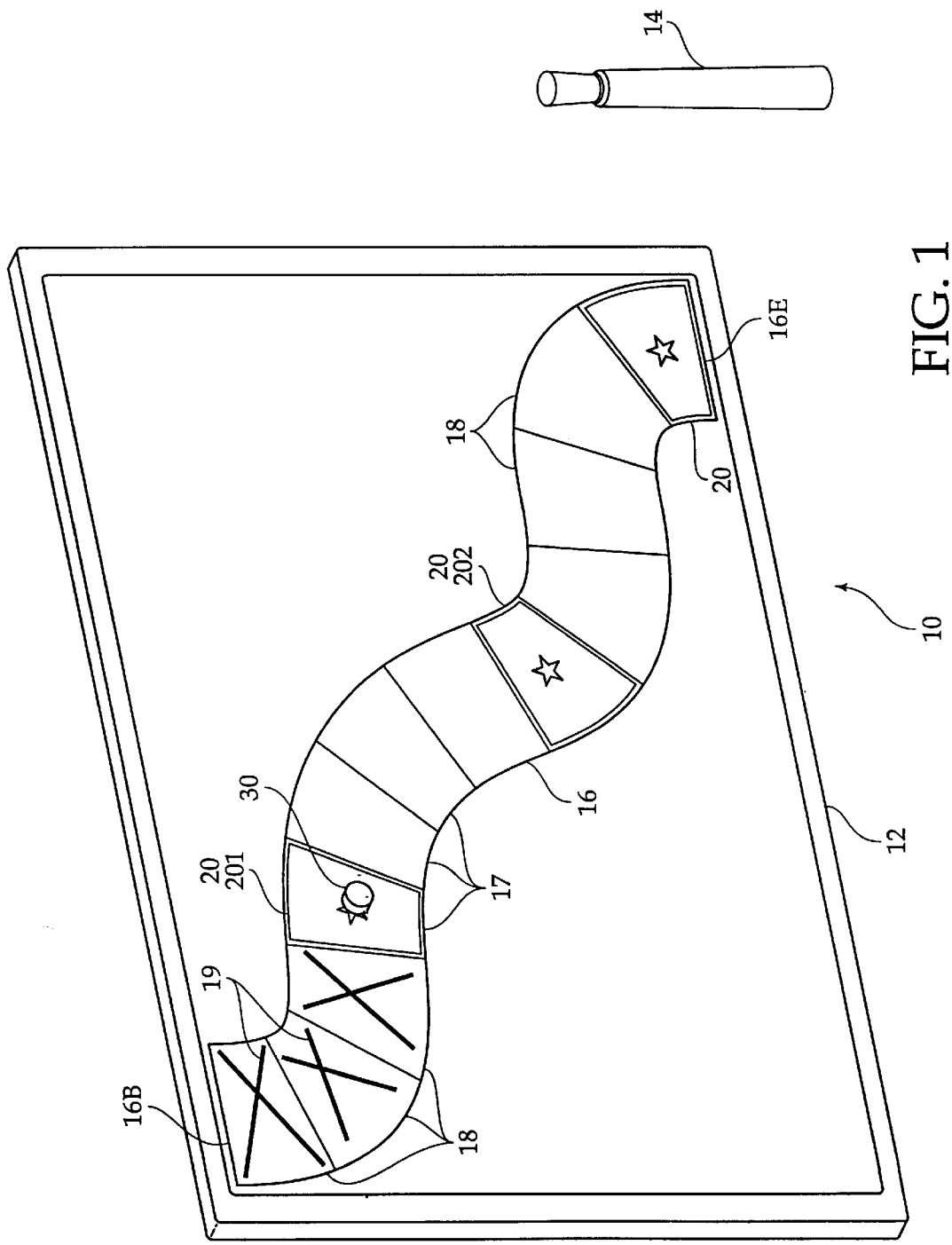
FIG. 1 is a diagrammatic perspective view of the invention, comprising a board having the pre-printed path, and a marker, wherein a plurality of step spaces have been marked with the marker, indicating successful toilet use, and progress toward the reward goal spaces.

FIG. 1 illustrates a toilet training system 10, comprising a board 12 and a marker 14. The board has a pre-printed path 16 extending across the board. The pre-printed path 16 may extend directly across the board in a straight line, travel from corner to corner in a wavy line as shown, or even "snake" back and forth across the board.

The pre-printed path 16 has a path beginning 16B and a path end 16E, and a plurality of spaces 17 between the path beginning and path end. The spaces 17 comprise step spaces 18 and reward goal spaces 20. A step space 18 is present at the path beginning 16B and a reward goal space 20 is present at the path end 16E. Several reward goal spaces 20 are present between the path beginning and path end, wherein said reward goal spaces 20 are separated by a consistent, predetermined number of step spaces 18. In the embodiment shown in the drawing figures, three step spaces 18 are present between each of the reward goal spaces 20. The reward goal spaces 20 include a first reward space 201, which is located nearest to the path beginning 16E, and a second reward space 202, which is located second nearest to the path beginning 16E.

The board 12 is preferably a dry marker type board, such that the marker 14 may be used to write upon the board, but said writing may be easily wiped clean from the board with a cloth when desired. Employing this type of board allows markings to be made upon the board to indicate toilet training progress, and to identify reward types being sought.

The toilet training device operates by providing positive reinforcement by allowing a child to set goals, which may be symbolized or recorded by the reward goal spaces 20, and to reach those goals by successfully completing a series of successful toilet usages as recorded by the step spaces 18.

In general, the toilet training method begins at the first reward space 201. A reward type is selected by the parent and child, so that the child knows what benefit he or she will receive through successful toilet usage. The toilet training continues at the path beginning 16B. If the child successfully uses the toilet, the step space 18 at the path beginning 16B will be marked with a marking 19. The child can then immediately visualize progress toward the reward goal resulting directly from his or her positive behavior. If the child successfully uses the toilet again, another step space 18, further along the path, i.e. closer to the reward goal 20, is marked. Once the step space 18 immediately before the reward goal 20 has been marked, the reward goal 20 has been reached, and the child is given the reward previously selected by the parent and child.

Figure 2:
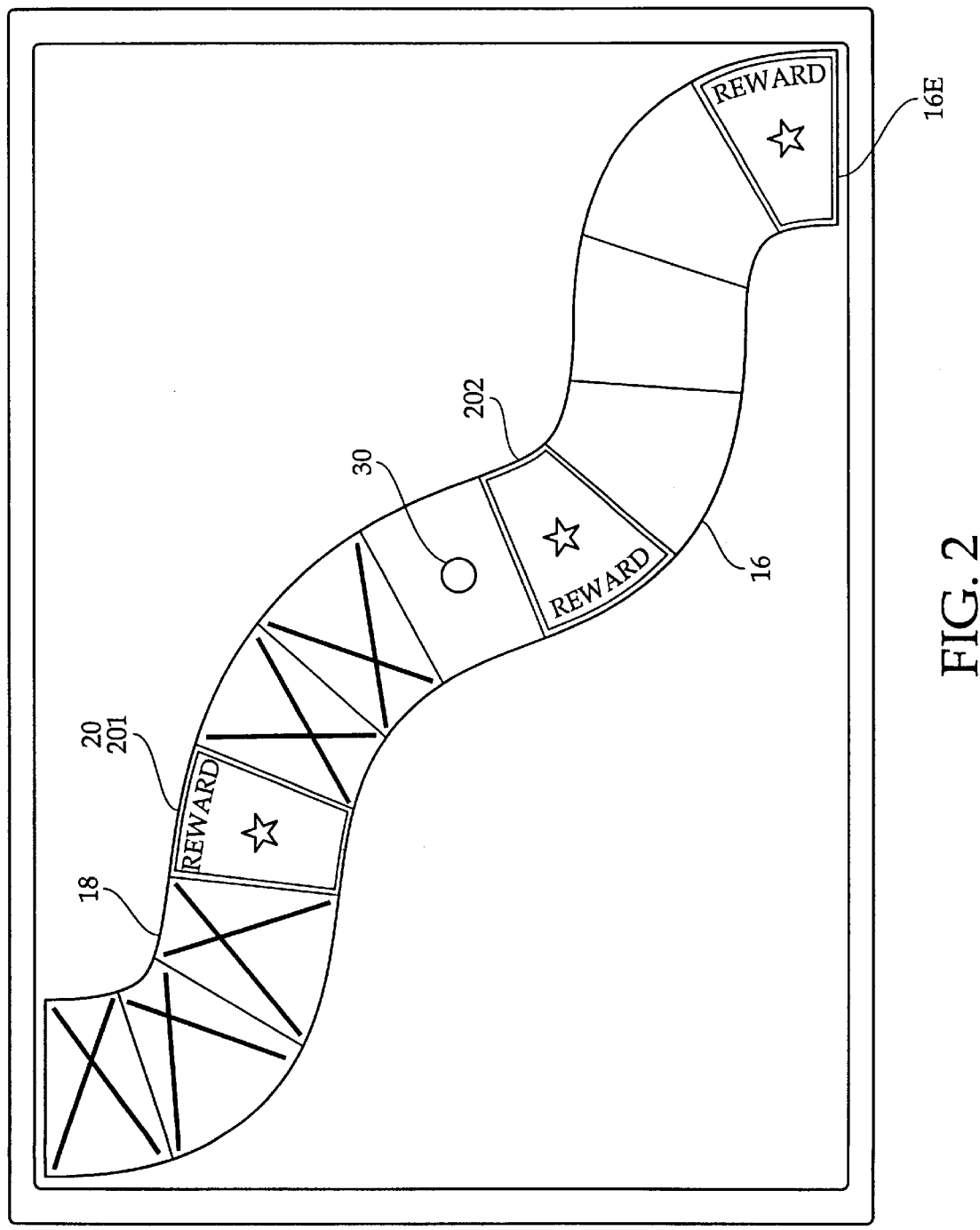
FIG. 2 is a front elevational view of just the board, wherein progress has been made along the path to and beyond the first reward goal spaces, wherein a second reward goal space is now being sought.

If the child fails to use the toilet, the last marked step space is erased, gently showing the child that the failure to use the toilet has resulted in a set-back in reaching the reward goal. In addition, once the first reward goal 201 has been reached, as seen in FIG. 2, a reward type for the second reward goal 202 can be selected by the parent and child. Then, the child progresses along the step spaces 18 beyond the first reward goal 201, continuing toward the second reward goal 202. Accordingly, each successive reward goal space 20 is sequentially reached until the reward goal 20 at the path end 16E is reached.

As seen in FIG. 1, FIG. 2, and FIG. 3, a place holder 30 may be used to indicate the current position on the board 12. Accordingly, the place holder 30 will always be one step beyond the last marked space along the path 16. For example, once the step space 18 just prior to one of the reward spaces is the last marked space, the place holder 30 will be appropriately present on that reward space, indicating that the reward has been earned. To allow vertical mounting of the board, it is preferable that the place holder 30 is magnetized, and that a ferro-metallic component is present within the board 12, so that the place holder 30 can be adhered to the board 12.

FIG. 3 illustrates how the reward type may be written in the reward goal space 20 itself, as reward type indicia 21. In the example illustrated, "amusement park" has been written upon the board within the reward goal space 20, indicating that once that reward goal space 20 has been reached, the child will be rewarded with a trip to the amusement park.

In conclusion, herein is presented a system for toilet training a child, using a board having a path which includes reward goal spaces separated by step spaces. As the child successfully uses the toilet, the child progresses along path one step space at a time, allowing the child to visualize progress toward a reward. When a reward space is reached, the child is rewarded—reinforcing the child's positive toilet training progress.

What is claimed is:

1. A toilet training method, for use by a parent and child, using a board having a pre-printed path having a path beginning, a path end, and a plurality of spaces between the path beginning and path end, including step spaces and reward goal spaces, the reward goal spaces are distributed on the path and are separated by a predetermined number of step spaces, the space at the path end is a reward goal space, the space at the path beginning is a step space, comprising the steps of:

selecting a reward type by the parent and child;

marking the step space at the path beginning when the child successfully uses the toilet;

marking step spaces following the last marked step space when the child again successfully uses the toilet; and rewarding the child with the previously chosen reward type when the step immediately before one of the reward goal spaces has been marked.

2. The toilet training method as recited in claim 1, further comprising the step of erasing the marking on the last marked step space when the child fails to successfully use the toilet.

3. The toilet training method as recited in claim 2, wherein the step of rewarding the child is followed by the steps of:

selecting a reward type by the parent and child, marking step spaces following the last marked step space when the child again successfully uses the toilet, and rewarding the child with the previously chosen reward type when the step immediately before one of the reward goal spaces has been marked;

wherein the steps of marking step spaces and rewarding the child are repeated until the reward goal space at the path end has been reached.

4. The toilet training method as recited in claim 2, wherein the steps of selecting a reward type by the parent and child further comprise writing the reward type in one of the reward goal spaces.

5. The toilet training method as recited in claim 4, further employing a place holder, wherein the place holder is located at the space following the last marked space.

* * * * *